US008411650B2

(12) United States Patent
Iyer et al.

(10) Patent No.: US 8,411,650 B2
(45) Date of Patent: Apr. 2, 2013

(54) METHOD AND SYSTEM FOR PROVIDING VIRTUAL PRIVATE NETWORK SERVICES THROUGH A MOBILE IP HOME AGENT

(75) Inventors: Jayaraman R. Iyer, Sunnyvale, CA (US); Navan Narang, San Jose, CA (US); Michael L. Shannon, San Jose, CA (US); Arghya T. Mukherjee, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 2202 days.

(21) Appl. No.: 11/108,560

(22) Filed: Apr. 18, 2005

(65) Prior Publication Data
US 2006/0233141 A1    Oct. 19, 2006

(51) Int. Cl.
*H04W 4/00*    (2009.01)
(52) U.S. Cl. ........ 370/338; 370/328; 370/349; 370/352; 370/356; 370/389; 370/395.52; 370/431; 709/227; 709/228; 709/229; 709/238; 709/245
(58) Field of Classification Search .................. 370/338, 370/352, 356, 400, 328, 329, 349, 389, 395.52, 370/431; 455/433, 435.1, 432.1, 436; 709/245, 709/238, 227, 228, 229
See application file for complete search history.

(56) References Cited

U.S. PATENT DOCUMENTS

| 6,016,318 | A | 1/2000 | Tomoike | 370/401 |
|---|---|---|---|---|
| 6,411,632 | B2 | 6/2002 | Lindgren et al. | 370/466 |
| 6,445,922 | B1 * | 9/2002 | Hiller et al. | 455/433 |
| 6,452,920 | B1 | 9/2002 | Comstock | 370/349 |
| 6,501,767 | B1 | 12/2002 | Inoue et al. | 370/465 |
| 6,539,237 | B1 | 3/2003 | Sayers et al. | 455/555 |
| 6,614,774 | B1 | 9/2003 | Wang | 370/338 |
| 6,658,259 | B2 | 12/2003 | McIntosh | 455/462 |
| 6,687,252 | B1 | 2/2004 | Bertrand et al. | 370/401 |
| 6,807,431 | B2 | 10/2004 | Sayers et al. | 455/555 |
| 6,856,624 | B2 | 2/2005 | Magret | 370/392 |
| 6,973,088 | B2 * | 12/2005 | Kuzhiyil et al. | 370/395.2 |
| 6,987,771 | B2 * | 1/2006 | Shimizu et al. | 370/401 |
| 6,988,146 | B1 * | 1/2006 | Magret et al. | 709/238 |
| 7,068,640 | B2 * | 6/2006 | Kakemizu et al. | 370/349 |
| 7,193,985 | B1 * | 3/2007 | Lewis et al. | 370/338 |
| 7,236,781 | B2 * | 6/2007 | Patil et al. | 455/432.1 |
| 7,280,505 | B2 * | 10/2007 | Chaskar et al. | 370/331 |
| 7,486,951 | B2 * | 2/2009 | Chen et al. | 455/432.1 |
| 2002/0112076 | A1 * | 8/2002 | Rueda et al. | 709/245 |
| 2004/0114553 | A1 * | 6/2004 | Jiang et al. | 370/328 |
| 2004/0120294 | A1 * | 6/2004 | Yang et al. | 370/338 |
| 2005/0286504 | A1 * | 12/2005 | Kwon | 370/356 |

* cited by examiner

*Primary Examiner* — Olumide T Ajibade Akonai
(74) *Attorney, Agent, or Firm* — Baker Botts L.L.P.

(57) ABSTRACT

A method for providing a virtual private network by home agent in a mobile IP environment includes providing a home agent operable to receive a registration request from a foreign agent and negotiate conditions of attachment of a mobile node to the foreign agent and further operable to store an IP address of the foreign agent in response to the negotiated conditions. The method also includes receiving, at the home agent, from the foreign agent, a registration request for the mobile node. The method also includes determining, by the home agent, a virtual private network membership of the mobile node based on a characteristic associated with the mobile node. The method further includes mapping the mobile node to an identifier associated with the home agent and transmitting the mapping to the foreign agent. The identifier is indicative of the virtual private network membership of the mobile subscriber. The method also includes receiving packets containing the identifier from the foreign agent and, in response, directing the packets to an IP address associated with the virtual private network.

36 Claims, 2 Drawing Sheets

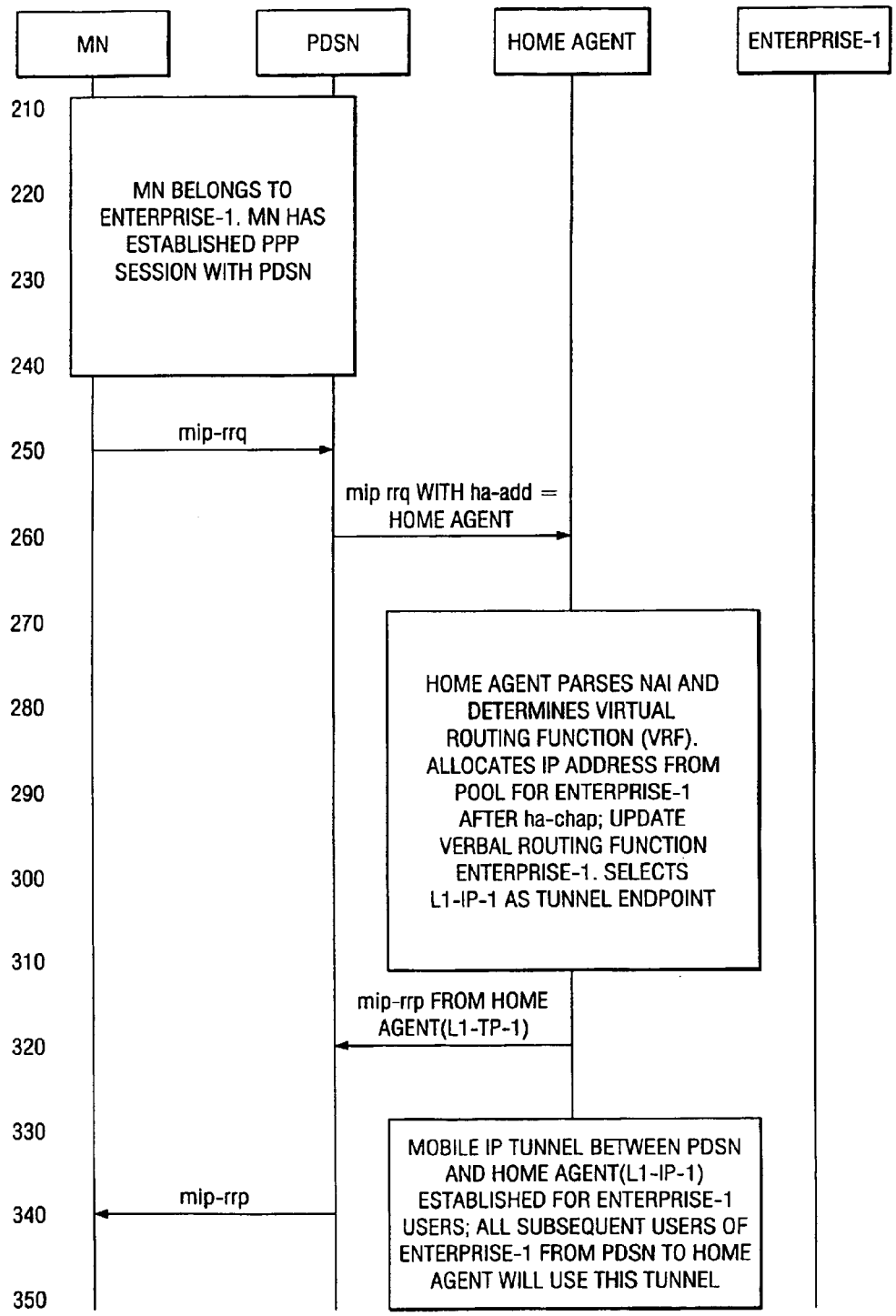

METHOD AND SYSTEM FOR PROVIDING VIRTUAL PRIVATE NETWORK SERVICES THROUGH A MOBILE IP HOME AGENT

TECHNICAL FIELD OF THE INVENTION

This invention relates generally to mobile IP communications and more particularly to a method and system for providing virtual private network services through a mobile IP home agent.

BACKGROUND OF THE INVENTION

Mobile IP is a protocol that allows laptop computer or other mobile units to roam between various sub-networks at various locations while maintaining internet connectivity. The mobile units are often referred to as mobile nodes. Without mobile IP or a related protocol, a mobile node would be unable to stay connected while roaming through various sub-networks. This is because the IP address required for any node to communicate over the internet is location specific. Each IP address has a field that specifies the particular sub-network on which the node resides. If a user desires to take a computer that is normally attached to one node and roam with it so that it passes through different sub-networks, it cannot use its home base IP address. As a result, a business person traveling across the country cannot roam with his or her computer across geographically disparate network segments or wireless nodes while remaining connected over the internet.

To address this problem, the Mobile IP protocol has been developed and implemented. One implementation of mobile IP is described in RFC 2002 of the Network Working Group, which is incorporated herein by reference. The Mobile IP protocol involves the use of one or more foreign agents and a home agent. The home agent is usually a router that is essentially the mobile node's "home base" and is the location to which IP traffic is directed. A foreign agent is also often a router through which a mobile node can connect to the home agent. Although mobile IP in its current form is used mainly as a connection from a foreign agent to a home agent, many service providers are deploying home agents as a way to aggregate their internal networks.

SUMMARY

According to one embodiment, a method for providing a network by a home agent in a Mobile IP environment includes providing a home agent operable to receive a registration request from a foreign agent and negotiate conditions of attachment of a mobile node to the foreign agent and further operable to store an IP address of the foreign agent in response to the negotiated conditions. The method also includes receiving, at the home agent, from the foreign agent, a registration request for the mobile node. The method also includes determining, by the home agent, a virtual private network membership of the mobile node based on a characteristic associated with the mobile node. The method further includes mapping the mobile node to an identifier associated with the home agent and transmitting the mapping to the foreign agent. The identifier is indicative of the virtual private network membership of the mobile node. The method also includes receiving packets containing the identifier from the foreign agent and, in response, directing the packets to an IP address associated with the virtual private network.

Embodiments of the invention may provide numerous technical advantages. Some embodiments may include some, none, or all of the below-listed advantages. According to one embodiment, a method and system are provided that allow a mobile subscriber to access a virtual private network associated with a home agent. Thus, companies may provide virtual networks to mobile subscribers that may be readily accessed through home agents without modifications to numerous foreign agents, saving expense associated with modification of multiple foreign agents.

Other advantages will be readily apparent to one of skill in the art.

BRIEF DESCRIPTION OF THE DRAWINGS

For a more complete understanding of the present invention and its advantages, references now made to the following description, taken in conjunction with the accompanying drawings, in which:

FIG. 4 is a call flow diagram illustrating example steps associated with providing virtual private network services according to the teachings of the invention.

DETAILED DESCRIPTION OF EXAMPLE EMBODIMENTS

Embodiments of the present invention and its advantages are best understood by referring to FIGS. 1 through 4 of the drawings, like numerals being used for like and corresponding parts of the various drawings.

Figure 1:
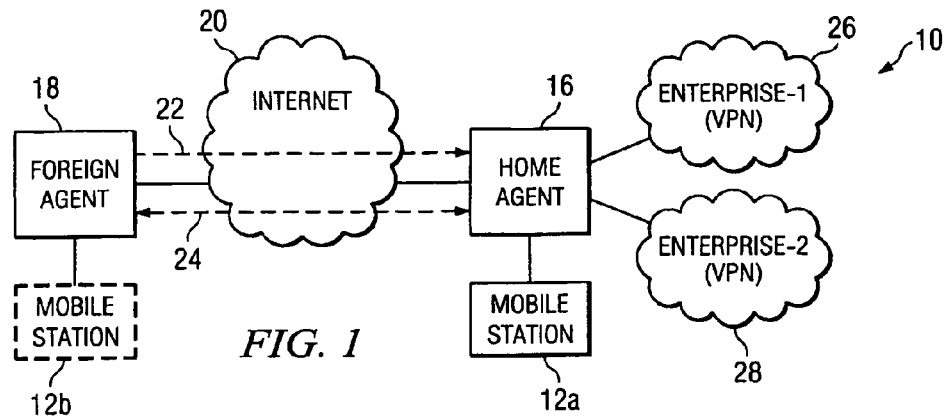
FIG. 1 is a schematic diagram illustrating a system of networks utilizing the teachings of the invention.

FIG. 1 is a schematic diagram illustrating a system 10 according to the teachings of the invention. System 10 includes a mobile station 12a, 12b, also referred to herein as a mobile node, a home agent 16, and a foreign agent 18. Home agent 16 and foreign agent 18 may communicate with each other through internet 20. In one embodiment, home agent 16 and foreign agent 18 are routers or other network connection devices performing appropriate mobile IP functions. These functions may be implemented by software, hardware, firmware or other suitable technique. In one example, foreign agent 18 is part of a Packet Data Serving Node (PDSN). Further, both foreign agent 18 and home agent 16 may comprise multiple internal foreign agents and home agents, and thus act as an agent farm. Mobile station 12a connects with internet 20 through its home agent 16. However, when the mobile station 12 roams, it communicates with internet 20 through an available foreign agent, such as foreign agent 18. Although only one foreign agent 18 is shown, often numerous foreign agents 18 are available at different geographic locations to allow widespread internet connection according to the Mobile IP protocol.

When mobile station 12b desires to connect to internet 20 through foreign agent 18, foreign agent 18 transmits a registration request to home agent 16, as indicated by reference numeral 22. Home agent 16 and foreign agent 18 may then negotiate the conditions of mobile station 12b attachment to foreign agent 18, as indicated by reference numeral 24. In one example, the attachment is limited to a specific period of time. When the negotiation is successfully completed, home agent 16 updates an internal mobility binding table that specifies the IP address of foreign agent 18 in association with the identity of mobile station 12b. In addition, foreign agent 18 updates an internal visitor table that specifies the IP address of the mobile station 12b and the IP address of home agent 16. This has the effect of shifting the mobile station's home IP address from the home agent 16 to the foreign agent 18.

The teachings of the invention recognize that home agents, such as home agents 16, may often be used to provide access to a plurality of networks 26, 28, one example of which is a virtual private network. A virtual private network generally refers to a private network that uses a public network to connect remote sites or users together. For example, home agent 16 may be operated by a service provider, such as Verizon, which in turn offers virtual private network services to various companies. In one example, Federal Express may provide a home web page associated with a virtual private network, such as virtual private network 26, to its mobile users through a Verizon home agent 16, while UPS provides a different home web page associated with a virtual private network, such as virtual private network 28. By allowing appropriate selection of a particular virtual private network 26, 28 associated with a home agent 16, a Federal Express or UPS employee may reap the advantages of the Mobile IP protocol and maintain constant connectivity with the virtual private networks of their respective companies, all through the same home agent.

The teachings of the invention recognize that home agent 18 may be configured to select an appropriate virtual private network 26, 28 for a mobile station 12 by allowing the home agent 16 to respond with the correct IP address of the virtual private network in a response to a registration request.

In one example, once a registration request for a mobile station has been received, home agent 16 selects the correct virtual private network 26, 28. Once the correct virtual private network has been selected, the address allocation for the end user is performed in accordance with its virtual private network membership. Once this is completed, home agent 16 maps the virtual private network 26, 28 to a local IP address, and uses this in the registration reply response back to the foreign agent 18. All subsequent data traffic from foreign agent 18 to the home agent 16 will then use the new local IP address as the end point. Home agent 16 then classifies these back to the correct virtual private network membership. Example details associated with example embodiments of such a method and system are described in greater detail below in conjunction with FIGS. 2 through 4.

Figure 2:
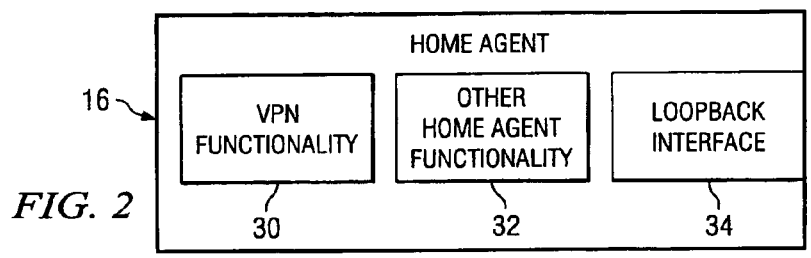
FIG. 2 is a block diagram illustrating a home agent of FIG. 1 according to the teachings of the invention.

FIG. 2 is a block diagram of home agent 16 according to the teachings of the invention. As illustrated, home agent 16 includes a virtual private network functionality block 30 and an other home agent functionality block 32. In general, virtual private network functionality block 30 contains functionality sufficient to allow appropriate selection of the virtual private network or enterprise 26, 28 to which a mobile user seeks to connect. Other home agent functionality block 32 provides all other functionality associated with home agent 16 implementing the Mobile IP Protocol.

Although illustrated as two separate functional blocks for simplicity, it will be understood that functions of each block 30 and 32 may be combined into a single functional unit. Further, home agent 16, including functional blocks 30 and 32, may be implemented in hardware, software, firmware, or in other suitable manners. In one particular example, functionality within a private block 30 and 32 is provided through software encoded in media, such as RAM, ROM, or other suitable media. Example functions associated with virtual private network functionality block 30 are described in greater detail below in conjunction with FIG. 3.

The teachings of the invention recognize that in order to support overlapping of IP addresses per enterprise 26, 28—multiple enterprise users sharing the same service provider home agent 16—a mechanism is needed to distinguish packets in foreign agent 18 for each enterprise 26, 28. According to one embodiment, this is achieved by using different IP addresses on home agent 16 corresponding to each enterprise 26, 28. In certain implementations, this results in the use of one mobile IP tunnel between foreign agent 18 and home agent 16 per enterprise 26, 28.

Different IP addresses for home agent 16 for each enterprise may be configured, in one example, by configuring a loopback interface 34 on the home agent 16. Multiple IP addresses may then be configured using the loopback interface. According to one implementation, the loopback interface 34 is configured such that it is always up, although the loopback interface could be configured in other manners.

As an example, a service provider abc.com may have two customers—xyz.com and mnp.com. On the abc.com home agent 16, there is a loopback interface 34 with IP addresses of IP-1 and IP-2 for xyz.com and mnp.com, respectively, configured under the loopback interface 34. A mobile IP tunnel is opened at the home agent 16 for abc.com with a tunnel source address of IP-1 and that for mnp.com is IP-2.

Figure 3:
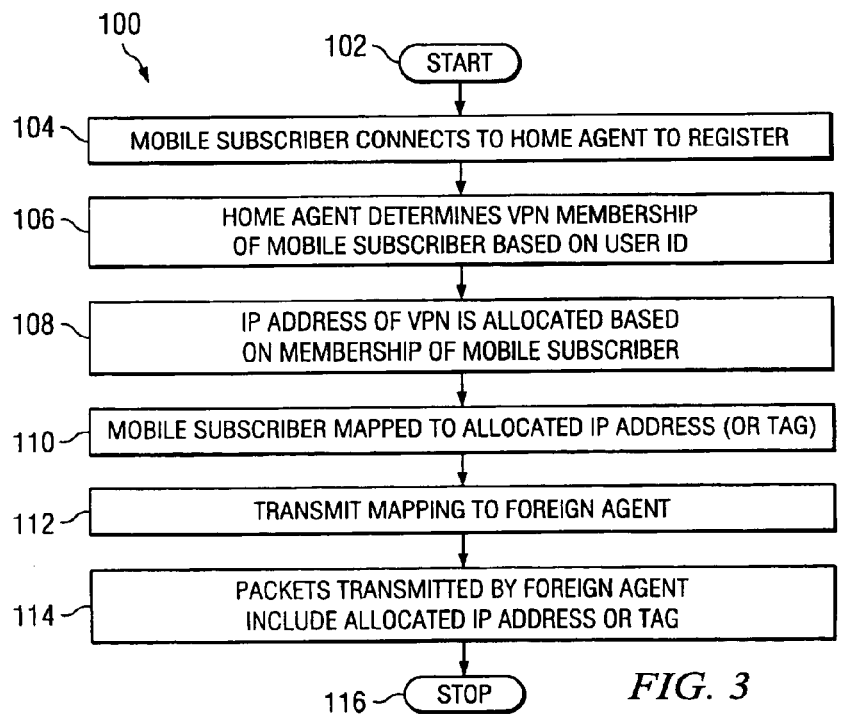
FIG. 3 is a flowchart illustrating a method for providing virtual private network services according to the teachings of the invention.

FIG. 3 is a flowchart illustrating a method 100 for providing virtual private network functionality via a home agent, such as home agent 16. The method begins at step 102. At step 104 a mobile subscriber, such as mobile subscriber 12a, 12b connects to a home agent to register. This registration occurs by a foreign agent sending a registration request to an associated home agent. At step 106, the home agent determines the virtual private membership of the mobile subscriber. One example of this determination is based on the user ID of the mobile subscriber, which is included within the registration request sent at step 104. However, other modes of determining the virtual private membership of the mobile subscriber can be used.

At step 108 the IP address of the virtual private network is allocated based upon the membership of the mobile subscriber. In addition, the IP address associated with the virtual private network to which the mobile subscriber belongs is determined. At step 110 the mobile subscriber is mapped to the allocated IP address. This mapping allows subsequent transmissions from the mobile subscriber to be sent to the allocated IP address. Alternatively, rather than allocating a particular IP address associated with the virtual private network, a tag may be utilized to direct transmissions to the appropriate virtual private network. This tag may be an inline field within one of the packet headers that is communicated between the foreign agent (PDSN) and the home agent, and used for identification of the virtual private network.

At step 112 the mapping of the indicated IP address (or other suitable identifier) is transmitted to the foreign agent. At step 114 packets transmitted by the foreign agent from the mobile subscriber include the allocated IP address or tag. Thus, when received by the home agent, the packets can be directed to the appropriate virtual private network. The method concludes at step 116.

Thus, according to one embodiment of the invention, the capability to provide virtual private network services employed with a home agent in an existing mobile IP network is provided, by allowing the home agent to map a local endpoint IP address to the virtual private network membership. In one embodiment, the deployment of virtual private network services on the home agent is accomplished without changes to the foreign agent, or any protocol changes.

FIG. 4 is a call flow diagram illustrating portions of an example call flow of the above described invention associated with providing access to a virtual private network according to the teachings of the invention. At step 210 through 240, the mobile node, which belongs to enterprise 1 establishes a PPP session with the PDSN, which in this example hosts the foreign agent functionality discussed. A PPP session is the point-to-point protocol used between the end-mobile user and the PDSN. At step 250 the mobile node sends a mobile IP registration request with, in one example, the home agent address set to 0.0.0.0, corresponding to a dynamic home agent, to the PDSN over its R-P session. At step 260 the PDSN forwards the mobile IP registration request to the home agent.

At steps 270 through 310, the home agent receives the mobile IP registration request. It parses the network access identifier inside the message and determines the virtual routing function of the mobile node based on it's realm, which is enterprise 1, in this example. The home agent then performs the user authentication and allocates the IP address. The home agent also creates a binding for the mobile node and populates the virtual routing function's specific data structures, such as route entry into a route table of virtual routing functions.

At step 320 the home agent sends the mobile IP registration reply to the home agent. At steps 330-350 the home agent establishes, in one embodiment, a mobile IP tunnel between the foreign agent and the home agent. The endpoint of the tunnel on the home agent is the IP address of enterprise 1, rather than the IP address of the ingress interface in the mobile IP registration request.

Although the above call flow diagram illustrates one example call flow, it should be understood that numerous variations on this call flow may be made. Further, although the present invention has been described with several embodiments, a myriad of changes, variations, alterations, transformations, and modifications may be suggested to one skilled in the art, and it is intended that the present invention encompass such changes, variations, alterations, transformations, and modifications as they fall within the scope of the appended claims.

What is claimed is:

1. A method for providing access to a network by a home agent in a Mobile IP environment comprising: providing a home agent operable to receive a registration request from a foreign agent and negotiate conditions of attachment of a mobile node to the foreign agent and further operable to store an IP address of the foreign agent in response to the negotiated conditions; receiving, at the home agent, from the foreign agent, a registration request for a mobile node; determining, by the home agent, a virtual private network membership of the mobile node based on a characteristic associated with the mobile node; mapping the mobile node to an identifier associated with the home agent and transmitting the mapping to the foreign agent, the identifier indicative of the virtual private network membership of the mobile node; and receiving packets containing the identifier from the foreign agent and in response directing the packets to an IP address associated with the virtual private network.

2. The method of claim 1, wherein the network is a virtual private network.

3. The method of claim 1, wherein the characteristic associated with the mobile node is a user ID for the network.

4. The method of claim 1, wherein the identifier comprises a tag.

5. The method of claim 1, wherein the identifier comprises an IP address of the network to which the mobile node is a member.

6. The method of claim 1, wherein the foreign agent comprises a PDSN.

7. The method of claim 1, wherein the home agent comprises a plurality of home agents.

8. The method of claim 2, and further comprising providing an IP address for the virtual private network by configuring a loopback interface in the home agent.

9. The method of claim 1, wherein the identifier comprises a combination of a tag and an IP address of the network to which the mobile node is a member.

10. A home agent comprising: logic encoded in media operable to: receive a registration request from a foreign agent and negotiate conditions of attachment of a mobile node to the foreign agent and further operable to store an IP address of the foreign agent in response to the negotiated conditions; determine a virtual private network membership of the mobile node based on a characteristic associated with the mobile node; map the mobile node to an identifier associated with the home agent and transmit the mapping to the foreign agent, the identifier indicative of the virtual private network membership of the mobile node; and receive packets containing the identifier from the foreign agent and in response direct the packets to an IP address associated with the virtual private network.

11. The home agent of claim 10, wherein the network is a virtual private network.

12. The home agent of claim 11, wherein the characteristic associated with the mobile node is a user ID for the virtual private network.

13. The home agent of claim 11, wherein the identifier comprises a tag.

14. The home agent of claim 11, wherein the identifier comprises an IP address of the virtual private network to which the mobile node is a member.

15. The home agent of claim 10, wherein the foreign agent comprises a PDSN.

16. The home agent of claim 10, wherein the home agent comprises a plurality of home agents.

17. The home agent of claim 11, and further comprising a loopback interface coupled to the media and operable to provide an IP address for the virtual private network.

18. The home agent of claim 10, wherein the identifier comprises a combination of a tag and an IP address of the network to which the mobile node is a member.

19. A Mobile IP network comprising:
a mobile node;
a foreign agent; and
a home agent operable to:
    receive a registration request from the foreign agent and negotiate conditions of attachment of the mobile node to the foreign agent and further operable to store an IP address of the foreign agent in response to the negotiated conditions;
    determine a virtual private network membership of the mobile node based on a characteristic associated with the mobile node;
    map the mobile node to an identifier associated with the home agent and transmit the mapping to the foreign agent, the identifier indicative of the virtual private network membership of the mobile node; and
    receive packets containing the identifier from the foreign agent and in response direct the packets to an IP address associated with the virtual private network.

20. The Mobile IP network of claim 19, wherein the characteristic associated with the mobile node is a user ID for the virtual private network.

21. The Mobile IP network of claim 19, wherein the identifier comprises a tag.

22. The Mobile IP network of claim 19, wherein the identifier comprises an IP address of the virtual private network to which the mobile node is a member.

23. The Mobile IP network of claim 19, wherein the foreign agent comprises a PDSN.

24. The Mobile IP network of claim 19, and further comprising the virtual private network.

25. The Mobile IP network of claim 19, wherein the home agent comprises a loopback interface operable to provide an IP address for the virtual private network.

26. The Mobile IP network of claim 19, wherein the home agent comprises a plurality of home agents.

27. The Mobile IP network of claim 19, wherein the identifier comprises a combination of a tag and an IP address of the network to which the mobile node is a member.

28. A method for providing a virtual network by a home agent in a Mobile IP environment comprising:
    establishing communication between a mobile subscriber and a foreign agent;
    providing a home agent operable to receive a registration request from the foreign agent and negotiate conditions of attachment of the mobile subscriber to the foreign agent and further operable to store an IP address of the foreign agent in response to the negotiated conditions;
    receiving at the home agent, from the foreign agent, a registration request for the mobile subscriber;
    determining, by the home agent, a virtual private network membership of the mobile subscriber based on a characteristic associated with the mobile subscriber;
    mapping the mobile subscriber to an identifier associated with the home agent and transmitting the mapping to the foreign agent, the identifier indicative of the virtual private network membership of the mobile subscriber;
    transmitting, to the foreign agent, packets from the mobile subscriber directed to the home agent;
    forwarding, by the foreign agent, the transmitted packets to the home agent; and
    identifying, by the home agent, the identifier in the received packets, and in response, directing the received packets to an IP address associated with the virtual private network.

29. The method of claim 28, wherein the characteristic associated with the mobile subscriber is a user ID for the virtual private network.

30. The method of claim 28, wherein the identifier comprises a tag.

31. The method of claim 28, wherein the identifier comprises an IP address of the virtual private network to which the mobile subscriber is a member.

32. The method of claim 28, wherein the foreign agent comprises a PDSN.

33. The method of claim 28, wherein the home agent comprises a plurality of home agents.

34. The method of claim 28, wherein the home agent comprises a loopback interface operable to provide an IP address for the virtual private network.

35. The method of claim 28, wherein the identifier comprises a combination of a tag and an IP address of the network to which the mobile subscriber is a member.

36. A home agent for use in providing a virtual private network comprising:
    structure operable to receive a registration request from a foreign agent and negotiate conditions of attachment of a mobile node to the foreign agent and further operable to store an IP address of the foreign agent in response to the negotiated conditions;
    means for determining a virtual private network membership of the mobile node based on a characteristic associated with the mobile node;
    means for mapping the mobile node to an identifier associated with the home agent in transmitting the mapping to the foreign agent, the identifier indicative of the virtual private membership of the mobile node; and
    means for receiving packets containing the identifier from the foreign agent and in response directing the packets to an IP address associated with the virtual private network.

* * * * *